United States Patent [19]

Horvath

[11] 4,084,375

[45] Apr. 18, 1978

[54] METHOD AND APPARATUS FOR GENERATING BUOYANCY POWER VIA ELECTROLYSIS

[76] Inventor: Janos Horvath, R.R. 1, Box 44, Martinsville, Ind. 46151

[21] Appl. No.: 774,196

[22] Filed: Mar. 3, 1977

[51] Int. Cl.² .......................... E02B 9/08; F03B 13/12
[52] U.S. Cl. .................................................... 60/496
[58] Field of Search ....................... 60/495, 496; 415/7

[56] References Cited

U.S. PATENT DOCUMENTS 2,513,136   6/1950   Borsos ..................................... 60/496

Primary Examiner—Allen M. Ostrager
Attorney, Agent, or Firm—Woodard, Weikart, Emhardt & Naughton

[57] ABSTRACT

A method and apparatus for generating buoyancy power comprising harnessing the buoyant energy contained in hydrogen and oxygen gases which are electrolytically generated under water. A first wheel is submerged in water with a second wheel submerged vertically beneath the first wheel. An endless belt engages and is stretched between the outer surfaces of the first and second wheels and is adapted to rotate the wheels when the belt is driven. A power generator is coupled to one of the wheels and is drivable therewith. As the hydrogen and oxygen gas bubbles are generated at the respective submerged electrodes of an electrolytic generator, the rising bubbles are separately caught in two columns of receptacles along one side of the belt thereby displacing the water from the receptacles and rendering them buoyant. The buoyant receptacles then drive the belt and the first and second wheels thereby causing the power generator to produce an electric current. The hydrogen and oxygen gases are then separately collected in submerged hoods as they are released from the respective columns of buoyant receptacles as the belt and receptacles move over the first wheel. Also provided are two funnels for channelling the hydrogen and oxygen gas bubbles from the submerged electrodes to the respective columns of receptacles.

11 Claims, 2 Drawing Figures

METHOD AND APPARATUS FOR GENERATING BUOYANCY POWER VIA ELECTROLYSIS

BACKGROUND OF THE INVENTION

1. Field of the Invention

The present invention relates to buoyancy power-generating devices and particularly to those devices which utilize electrolysis to produce the buoyant power.

2. Description of the Prior Art:

Various devices are known in the art which attempt to capitalize on the great potential of buoyancy energy, with varying degrees of success. Several of such devices are disclosed in the following patents:

| | | | |
|---|---|---|---|
| 211,143 | Pogarty | Jan. | 7, 1879 |
| 2,513,136 | Borsos | June | 27, 1950 |
| 3,194,008 | Baumgartner | July | 13, 1965 |
| 3,715,885 | Schur | Feb. | 13, 1973 |
| 3,857,242 | Gilmore | Dec. | 31, 1974 |
| 3,907,454 | Punton | Sept. | 23, 1975 |
| 3,918,827 | Conn et al. | Nov. | 11, 1975 |
| 3,934,964 | Diamond | Jan. | 27, 1976 |

However, only one of the above devices attempts to generate buoyancy power by harnessing the hydrogen and oxygen gases produced in electrolysis. The Borsos patent discloses a sealed container in which a single column of receptacles affixed to a single chain are employed to capture both the hydrogen and oxygen produced at the submerged electrodes. The upper sprocket wheel is only partially submerged in the electrolyte and all the gas released from the receptacles is collected by a single above-water outlet pipe.

The present invention marks a substantial improvement over the Borsos and other prior art devices. First, the present invention is not restricted to an enclosed container, but rather may be adapted to operate in large bodies of water such as a pond, lake, or ocean. This is advantageous because there are no dimensional restrictions placed on the apparatus of the present invention. The abundant supply of electrolyte (water) in such large bodies also alleviates any possible problem of pumping or recirculating the electrolyte to maintain its proper level in the container. Furthermore, it is proven that the electrolytic process operates more efficiently under greater pressures, as may be obtained in such large bodies of water.

Second, the present invention separately harnesses the hydrogen and oxygen gas bubbles produced at the electrodes using two separate columns of receptacles and then separately collects the gases as they are released. This is advantageous because both gases are presently in great economic demand thereby making their separate collection a significant advance over the prior art.

Third, the entire apparatus of the present invention is submerged in water. By so doing, no energy is wasted combating gravitational forces, as occurs in Borsos when the receptacles move around the partially-submerged upper wheel. Also unlike Borsos, having the separate collecting means under water greatly enhances the collecting operation while also providing a natural buoyant gas pressure in the collecting chambers which significantly assists in pumping the gases to the awaiting storage containers. Finally, the totally-submerged apparatus of the present invention further broadens its versatility by allowing the present invention to be submerged far below the surface of a particular body or container of water.

Fourth, the simultaneously-generated electricity may be fed back into the electrolytic generator in order to reduce the net energy consumption of this hydrogen and oxygen-producing plant. When the self-generated electricity is utilized within the plant, the efficiency of the apparatus improves due to savings in the transportation and/or storage of electric power.

SUMMARY OF THE INVENTION

One embodiment of the present invention comprises a buoyancy power-generating device including means for electrolytically generating hydrogen and oxygen gases under water, means positioned between the means for generating and the water surface for separately harnessing the buoyant energy contained in the rising hydrogen and oxygen gas bubbles, and means for separately collecting the hydrogen and oxygen gas bubbles for later use.

More specifically, a first and a second wheel are spaced vertically apart and are submerged in water vertically above the means for generating. An endless belt engages the outer surfaces of the wheels and is operated to rotate the wheels when the belt is driven. A plurality of receptacles are affixed in two vertical columns to the outer surface of the belt and are oriented to separately catch the rising hydrogen and oxygen gas bubbles along one side of the belt thereby rendering the receptacles along the one side buoyant. These buoyant receptacles exert a force of sufficient magnitude to drive the belt and a power generator which is drivably coupled to one of the rotating wheels. The means for generating includes an electrolytic generator and two electrodes, with directing means being provided to separately channel the hydrogen and oxygen gas bubbles from the respective electrodes to the respective columns of receptacles. The means for separately collecting the gases is also submerged in water vertically above the columns of buoyant receptacles.

A second embodiment of the present invention comprises a method of generating buoyant power including the steps of electrolytically generating hydrogen and oxygen gases under water, separately harnessing the buoyant energy contained in the rising hydrogen and oxygen gas bubbles, and separately collecting the hydrogen and oxygen gas bubbles for later use. The step of separately harnessing the buoyant energy of the gas bubbles additionally comprises separately catching the hydrogen and oxygen gas bubbles in two vertical columns of receptacles along the outer surface of an endless belt which rotatably engages the outer surfaces of a first and second wheel and drivably coupling one of the wheels to a power generator operable to generate an electric current.

An object of the present invention is to provide an improved method and apparatus for harnessing buoyancy power via electrolysis in which the buoyant energy in the hydrogen and oxygen gases are separately harnessed and the gases are then separately collected for later use.

Another object of the present invention is to provide an improved method and apparatus for harnessing buoyancy power via electrolysis which is simple in operation, economically practicable and functionally capable of meeting the rising energy needs of our modern society.

Further objects and advantages of the present invention will become apparent from the following description and claims, and from the accompanying drawings.

DESCRIPTION OF THE PREFERRED EMBODIMENT

Figure 1:
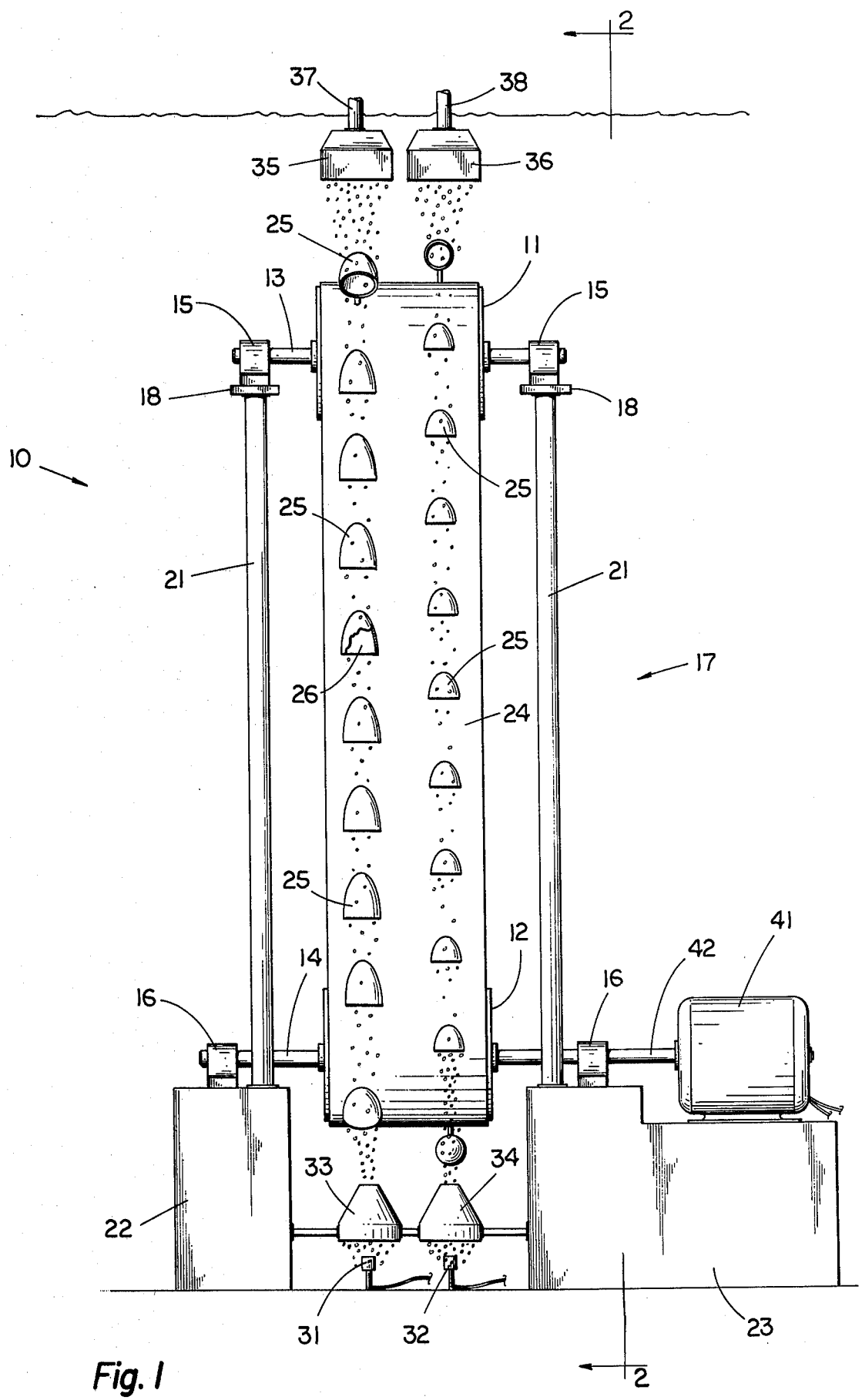
FIG. 1 is a front view of the buoyancy power-generating device comprising the preferred embodiment of the present invention in operation.

For the purposes of promoting an understanding of the principles of the method and apparatus of the present invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
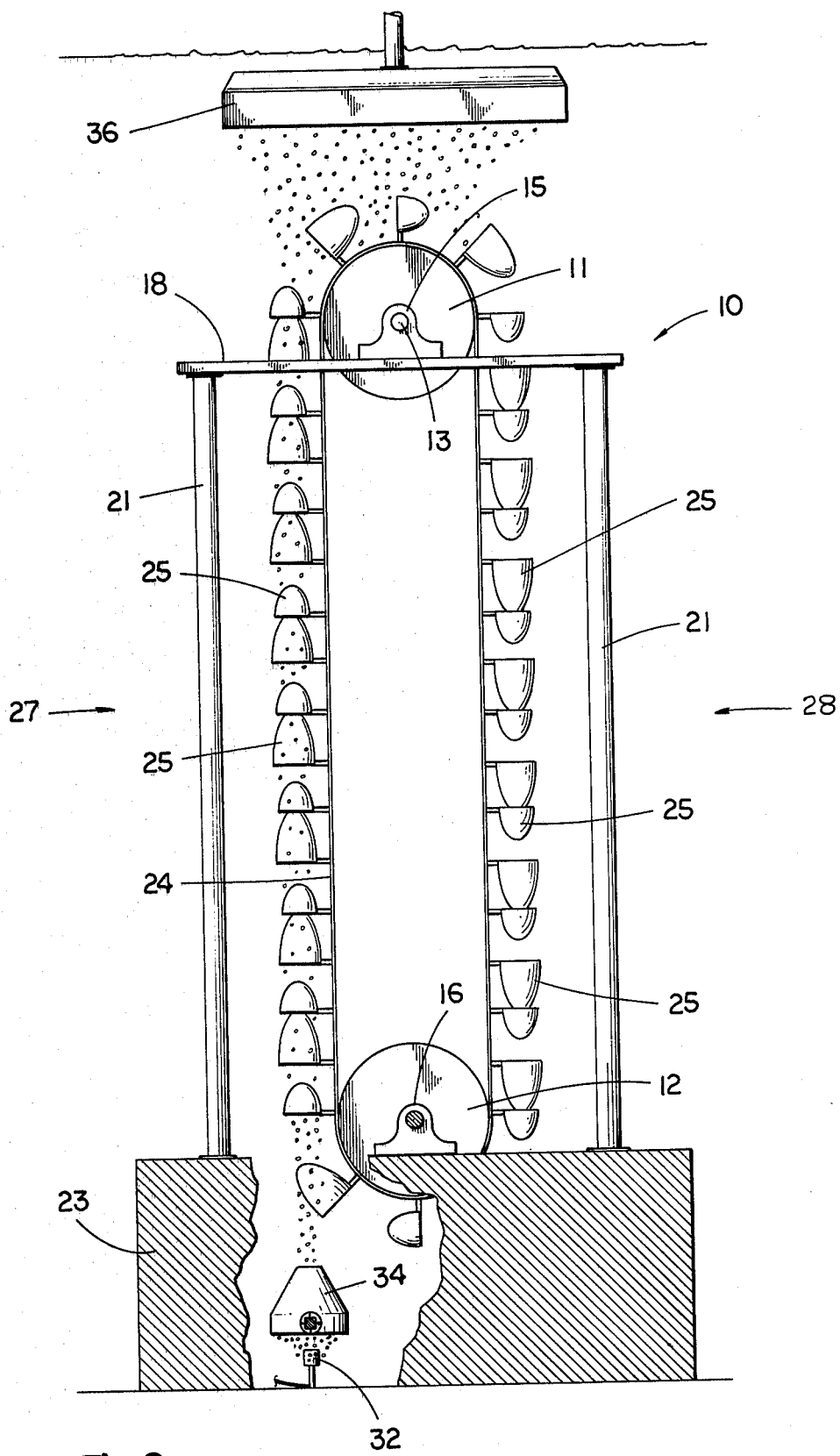
FIG. 2 is a fragmented side view of the device in FIG. 1 taken along line 2—2.

Referring now to FIGS. 1 and 2, the buoyancy power-generating device 10 comprising the preferred embodiment of the present invention is therein depicted. A first and a second wheel 11 and 12, respectively, are submerged in water with the second wheel positioned vertically beneath the first. Each wheel is securely mounted on a rod or shaft 13 and 14, respectively, with each rod being bearingly mounted in a pair of sealed bearing blocks 15 and 16, respectively. The bearing blocks are then securely mounted in a supporting structure 17 which supports the wheel arrangement in the water thereby allowing the device to operate.

The buoyancy power-generating device comprising the preferred embodiment of the present invention is designed to operate in any container or body of water wherein the device may be mounted to the floor or bottom of the container or body. The supporting structure 17 is therefore also designed for such an operation. Each bearing block 15 is securely mounted to a supporting plate 18 which in turn contacts two supporting posts 21. The supporting posts are then securely attached to two base supports 22 and 23 which rest on the bottom of the container or body of water thereby supporting the entire structure. The exact arrangement and dimensions of the supporting structure accompanying the buoyancy power-generating device of the present invention is highly variable and can be readily adapted to support any size power-generating device in any appropriately-sized container or body of water.

An endless belt 24 engages the outer surfaces of the first and second wheels 11 and 12. The belt is stretched tightly between the two wheels thereby creating a frictional contact which operates to rotate the wheels when the belt is driven.

A plurality of hollow receptacles 25 are affixed in two vertical columns to the outer surface of belt 24 along its entire length. Each receptacle is oriented such that its open recess or cavity 26 is directed vertically downward along side 27 of buoyancy power-generating device 10 and vertically upward along said 28, as shown in FIG. 2. The receptaces are thereby adapted to separately catch the hydrogen and oxygen gas bubbles generated at the respective two electrodes 31 and 32 which are positioned vertically beneath the respective columns of receptacles along side 27 of the device. An electrolytic generator (not shown) is connected to the two electrodes and operates to generate the hydrogen and oxygen gases caught by the respective columns of receptacles.

Two channelling funnels or veins 33 and 34 are positioned directly above electrodes 31 and 32, respectively, and operate to channel or direct the hydrogen and oxygen gas bubbles produced at the respective electrodes to the awaiting columns of receptacles. Two gas-collecting hoods 35 and 36 are also submerged in the water and are positioned vertically above the respective columns of receptacles. These hoods operate to separately collect the released hydrogen and oxygen gas bubbles as the belt and gas-filled buoyant receptacles move across the surface of first wheel 11. The hydrogen and oxygen gases are then moved through outlet pipes 37 and 38, respectively, to awaiting gas storage containers (not shown) where they are separately stored for later use or sale.

Although a pumping arrangement (not shown) may be required to move the gases through the outlet pipes, the buoyant pressure of the gases in the respective hoods provides an additional force which aids in moving the gases to the respective storage containers. This added force due to the buoyant pressure of the gases will, of course, substantially increase as the buoyancy power-generating device 10 is submerged farther beneath the surface of the water.

A power generator or dynamo 41 is coupled to a rotatable drive shaft 42 which in turn is connected to rod 14 of second wheel 12. The power generator is thereby also driven when the first and second wheels 11 and 12 are rotated by belt 24. The electric current produced by the generator is then conducted to electricity storage batteries (not shown) for later use or sale.

To operate the buoyancy power-generating device 10 comprising the preferred embodiment of the present invention, the electrolytic generator is first switched on thereby producing hydrogen and oxygen gas bubbles at the respective electrodes 31 and 32. The rising hydrogen and oxygen gas bubbles are channelled through funnels 33 and 34 to the respective columns of receptacles where the gas bubbles begin displacing the water from the vertically downwardly-directed recesses in the receptacles along side 27. As the recesses are filled with gas, the receptacles become buoyant thereby exerting a certain amount of upward force on belt 24. To begin operation, it may be necessary to actuate power generator 41 thereby slowly rotating shaft 42 and first and second wheels 11 and 12 because of the increased energy needed to start belt 24 in motion. However, as more of the receptacles along side 27 become filled with gas, the buoyant force exerted on belt 24 is substantially increased until the time that this buoyant force is alone sufficient to drive the belt. At that time, power input into generator 41 is halted. As the belt and wheel assembly approaches its normal operating speed, the rotation imparted through shafts 14 and 42 to power generator 41 becomes sufficient to cause the generator to produce an electric current. The generator is then connected to the storage batteries or to other means of utilization.

Meanwhile, as the belt and gas-filled buoyant receptacles move across the surface of first wheel 11, the hydrogen and oxygen gas bubbles are released into gas-collecting hoods 35 and 36, respectively. The respective gases are then moved through outlet pipes 37 and 38 to gas storage containers.

Due to the nature of the electrolysis reaction, the ratio of hydrogen to oxygen produced at the respective electrodes is about two to one. This means that twice as much hydrogen gas must be caught in the receptacles and collected in the hood. In the preferred embodiment, the receptacles positioned to collect the hydrogen gas generated at electrode 31 are dimensioned to hold about twice the volume of gas as those receptacles positioned to catch the oxygen gas. Various other alternatives are also available to accommodate the greater ratio of hydrogen to oxygen, such as providing twice as many receptacles in the column collecting the hydrogen gas.

Various external configurations may be used for the plurality of receptacles 25 affixed to belt 24. However, in the prefeffed embodiment of the present invention, a paraboloidal configuration is employed because it presents the least resistance as the receptacles travel through the water.

Although the above represents the preferred embodiment of the method and apparatus of the present invention, various other designs may be employed which in turn will vary the total net energy gained from harnessing the buoyant energy inherent in the rising hydrogen and oxygen gas bubbles. Two examples of other possible designs include an adaptation of a common water wheel and a dual turbine arrangement in which the water current produced by the rising gas bubbles is used to drive the turbine blades.

The ultimate goal in choosing a particular design is naturally to optimize the hydrogen and oxygen production in the electrolytic process while simultaneously minimizing the losses inherent in the mechanics of the device. Another advantage of the present invention is that it has been experimentally proven that the efficiency of electrolysis is increased at greater pressures. The versatility of the present invention allows the electrodes to be positioned far beneath the water surface thereby providing the increased pressure which results in more optimal hydrogen and oxygen production.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A buoyancy power-generating device comprising:
    (a) means for electrolytically generating hydrogen and oxygen gases under water;
    (b) means positioned between said means for generating and the water surface for separately harnessing the buoyant energy contained in the rising hydrogen and oxygen gas bubbles;
    (c) and means for separately collecting the hydrogen and oxygen gases for later use.

2. The device of claim 1 in which said means for collecting is positioned between said means for harnessing and the water surface.

3. The device of claim 2 in which said means for harnessing comprises:
    (a) a rotatable first wheel submerged in water vertically above said means for generating;
    (b) a power generator;
    (c) means including a rotatable drive shaft for coupling said generator with said first wheel, said first wheel thereby driving said generator when said first wheel is rotated;
    (d) a plurality of receptacles affixed in two columns around the outer surface of said first wheel, said receptacles being oriented such that the respective columns of receptacles along one side of said first wheel separately catch the hydrogen and oxygen gas bubbles produced by said means for generating thereby displacing the water from said receptacles and rendering said receptacles buoyant, said buoyant receptacles exerting a force of sufficient mangitude to rotate said first wheel.

4. The device of claim 3 in which said means for harnessing additionally comprises:
    (a) a rotatable second wheel submerged in water vertically beneath said first wheel and above said means for generating;
    (b) and an endless belt engaging the outer surfaces of said first and second wheels, said receptacles being affixed in two vertical columns to the outer surface of said belt, said belt stretched between said first and second wheels and adapted to rotate said wheels when said belt is driven by said buoyant receptacles.

5. The device of claim 4 additionally comprising directing means for separately channelling the hydrogen and oxygen gas bubbles produced at said means for generating to the respective columns of receptacles along the outer surface of said belt.

6. The device of claim 5 in which said receptacles are paraboloidal in configuration and extend throughout the length of said belt.

7. The device of claim 6 additionally comprising means for storing the power produced by said power generator for later use.

8. The device of claim 7 in which said means for generating comprises an electrolytic generator including two electrodes, the electrodes being positioned vertically beneath said means for collecting and the respective columns of buoyant receptacles along the outer surface of said belt.

9. A method of generating buoyant power comprising:
    (a) electrolytically generating hydrogen and oxygen gases under water;
    (b) separately harnessing the buoyant energy contained in the rising hydrogen and oxygen gas bubbles;
    (c) and separately collecting the hydrogen and oxygen gas bubbles for later use.

10. The method of claim 9 in which said separately collecting is done under water.

11. The method of claim 9 in which said harnessing comprises:
    (a) separately catching the respective hydrogen and oxygen gas bubbles in two vertical columns of receptacles along the outer surface of an endless belt which is stretched between a first and a second wheel, the gas-filled buoyant receptacles exerting a force of sufficient magnitude to drive the belt and thereby rotate the first and second wheels;
    (c) and drivably coupling one of the first and second wheels to a power generator operable to generate an electric current.

* * * * *